US010657018B1

(12) United States Patent
Nam et al.

(10) Patent No.: US 10,657,018 B1
(45) Date of Patent: May 19, 2020

(54) SYSTEMS AND METHODS FOR DYNAMIC AGGREGATION OF DATA AND MINIMIZATION OF DATA LOSS

(71) Applicant: COUPANG CORP., Seoul (KR)

(72) Inventors: Il Won Nam, Seoul (KR); Seung Hoon Park, Gyeonggi-do (KR); Ki Young Kim, Seoul (KR)

(73) Assignee: COUPANG CORP., Seoul (KR)

( * ) Notice: Subject to any disclaimer, the term of this patent is extended or adjusted under 35 U.S.C. 154(b) by 0 days.

(21) Appl. No.: 16/551,091

(22) Filed: Aug. 26, 2019

(51) Int. Cl.
*G06F 11/00* (2006.01)
*G06F 11/30* (2006.01)
*G06F 11/14* (2006.01)
*G06F 16/906* (2019.01)
*G06F 16/25* (2019.01)

(52) U.S. Cl.
CPC ...... *G06F 11/3075* (2013.01); *G06F 11/1471* (2013.01); *G06F 11/3068* (2013.01); *G06F 16/258* (2019.01); *G06F 16/906* (2019.01)

(58) Field of Classification Search
CPC ............. G06F 11/3068; G06F 11/3072; G06F 11/3075; G06F 11/3082; G06F 11/3086
See application file for complete search history.

(56) References Cited

U.S. PATENT DOCUMENTS

| | | | |
|---|---|---|---|
| 7,165,036 B2 * | 1/2007 | Kruk | G06F 17/27 705/7.11 |
| 9,292,590 B2 * | 3/2016 | Baum | H04L 63/1425 |
| 9,477,784 B1 * | 10/2016 | Bhave | G06F 16/284 |
| 10,452,665 B2 * | 10/2019 | Poghosyan | H03M 7/00 |
| 2005/0076067 A1 * | 4/2005 | Bakalash | G06F 16/2455 |
| 2005/0216421 A1 * | 9/2005 | Barry | G06F 11/0709 705/64 |
| 2006/0184473 A1 * | 8/2006 | Eder | G06N 5/022 706/20 |
| 2008/0294996 A1 * | 11/2008 | Hunt | G06Q 30/02 715/739 |
| 2017/0126741 A1 * | 5/2017 | Lang | G06F 21/57 |
| 2018/0173734 A1 * | 6/2018 | Kripalani | H04L 67/1097 |
| 2019/0097909 A1 * | 3/2019 | Puri | H04L 41/5035 |

* cited by examiner

*Primary Examiner* — Elmira Mehrmanesh
(74) *Attorney, Agent, or Firm* — Finnegan, Henderson, Farabow, Garrett & Dunner LLP

(57) ABSTRACT

A computer-implemented system for dynamic aggregation of data and minimization of data loss is disclosed. The system may be configured to perform instructions for: aggregating information from a plurality of networked systems by collecting a set of data from the networked systems, the set of data comprising data associated with a predetermined period of time and comprising one or more central variables that are included in data associated with more than one networked systems of the plurality of networked systems and one or more associated variables that describe one or more aspects of the central variables; retrieving one or more data transformation rules based on a relational map among the central variables and the associated variables; and aggregating the first set of data into one or more master data structures corresponding to the central variables based on the data transformation rules.

18 Claims, 10 Drawing Sheets

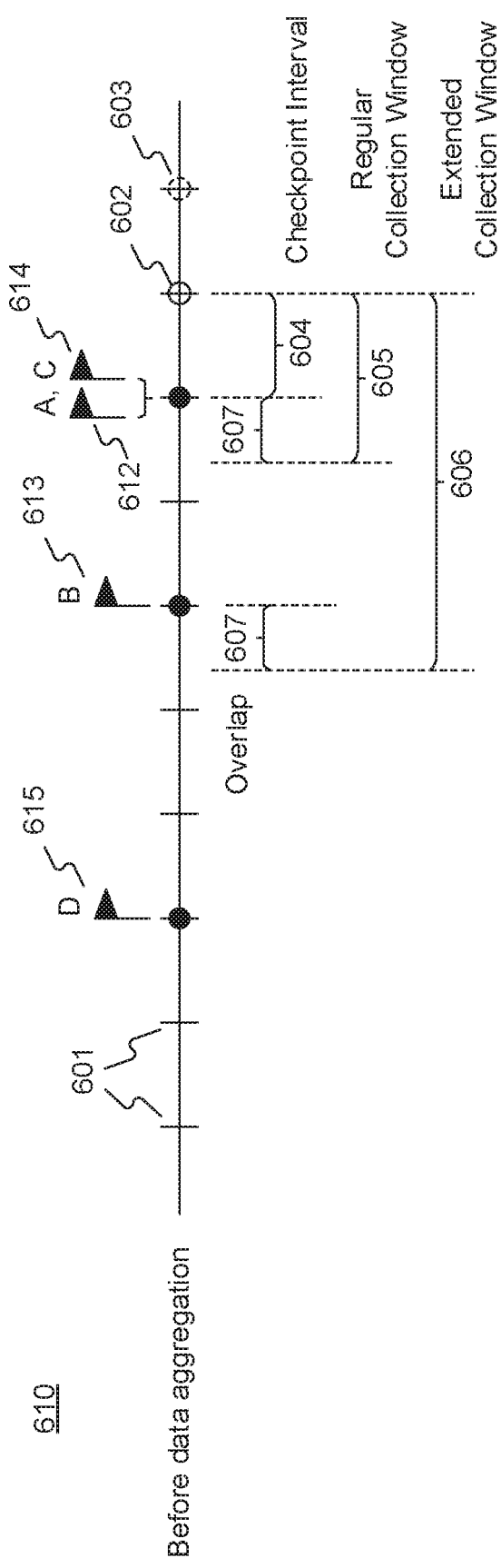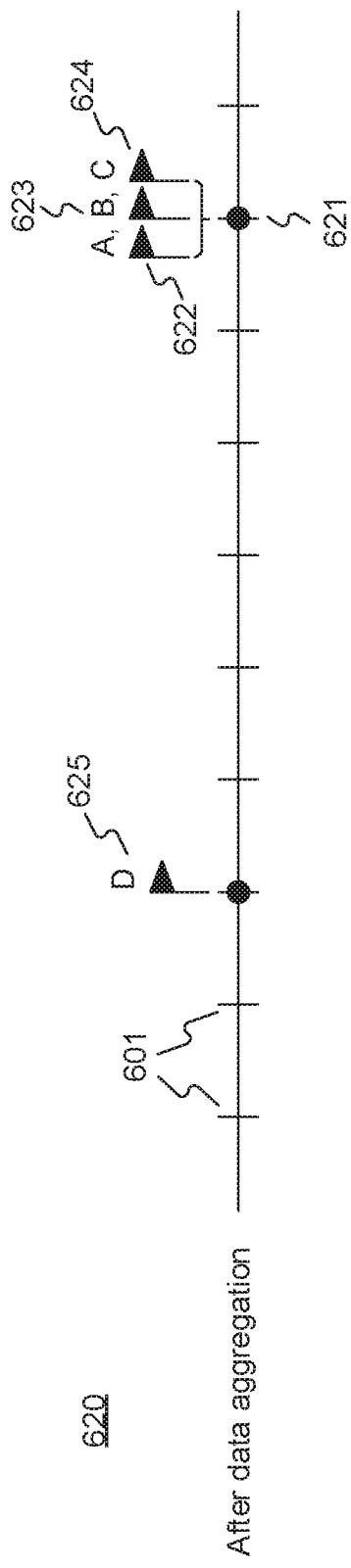
FIG. 6A
FIG. 6B

SYSTEMS AND METHODS FOR DYNAMIC AGGREGATION OF DATA AND MINIMIZATION OF DATA LOSS

TECHNICAL FIELD

The present disclosure generally relates to computerized methods and systems for dynamically aggregating data from multiple networked systems and minimizing data loss from unexpected events such as system outage. In particular, embodiments of the present disclosure relate to inventive and unconventional systems that aggregate data from multiple networked systems that use different data types and formats. The aggregated data are reconciled into a proprietary format that enables near real-time access to arbitrary combinations of data and minimizes data loss.

BACKGROUND

Advancement of information technology has a wide implementation of networked systems where businesses of various sizes utilize multiple computing systems to facilitate their operations. The use can range from simple event logging to database management and analytics. As more operations are computerized and businesses grow in size, the volume of available data is rapidly increasing and frequently overwhelming. Moreover, different networked systems may use different data types and formats, making it difficult for business owners and managers to understand the vast amount of data and make appropriate decisions. Effective and efficient management of such vast amount of data can provide significant competitive advantage.

Another complicating factor arises in collection and storage of such data, where networked systems are susceptible to unexpected problems such as network-wide outages or system level failures. These circumstances are detrimental to the collection and storage of data from the networked systems because network outages can prevent all data from being transferred from one system to another and system level failures can result in data loss until the problems are resolved. Prior art systems have not been able to account for such failures, skipping data aggregation if a networked system is unavailable or being unable to resume aggregation from the last successful aggregation.

Still further, the data collection is also without merit if the data collection and analysis occur over a long period of time. "A long period" is a relative term where even a 10-minute delay in the collection and analysis may be too long in some circumstances while other systems may be okay with collecting data only once per day. As business operations advance to require more rapid responses, however, a real-time or a near real-time data collection and analysis become more important.

Therefore, there is a need for dynamic aggregation of data in near real-time from different networked systems that can collect data of different formats and types, reconciling them to a single format to support sophisticated analysis, while being robust enough to account for unexpected problems and resume collection once the problems are resolved.

SUMMARY

One aspect of the present disclosure is directed to a computer-implemented system for dynamic aggregation of data and minimization of data loss. The system may comprise a memory storing instructions; and at least one processor configured to execute the instructions. The instructions may comprise: aggregating information from a plurality of networked systems by collecting a first set of data at a first time point from the networked systems, the first set of data comprising data associated with a predetermined period of time and comprising one or more central variables that are included in data associated with more than one networked systems of the plurality of networked systems and one or more associated variables that describe one or more aspects of the central variables, each of the central variables and the associated variables comprising a corresponding value; retrieving one or more data transformation rules based on a relational map among the central variables and the associated variables; and aggregating the first set of data into one or more master data structures corresponding to the central variables based on the data transformation rules, each of the one or more master data structures comprising one or more data fields that correspond to one of the central variables and a subset of the associated variables; and generating one or more data reports based on the master data structures.

Yet another aspect of the present disclosure is directed to a computer-implemented method for dynamic aggregation of data and minimization of data loss. The method may comprise steps for aggregating information from a plurality of networked systems by: collecting a first set of data at a first time point from the networked systems, the first set of data comprising data associated with a predetermined period of time and comprising one or more central variables that are included in data associated with more than one networked systems of the plurality of networked systems and one or more associated variables that describe one or more aspects of the central variables, each of the central variables and the associated variables comprising a corresponding value; retrieving one or more data transformation rules based on a relational map among the central variables and the associated variables; and aggregating the first set of data into one or more master data structures corresponding to the central variables based on the data transformation rules, each of the one or more master data structures comprising one or more data fields that correspond to one of the central variables and a subset of the associated variables; and generating one or more data reports based on the master data structures.

Furthermore, another aspect of the present disclosure is directed to a computer-implemented system for dynamic aggregation of data and minimization of data loss. The system may comprise a memory storing instructions; and at least one processor configured to execute the instructions. The instructions may comprise aggregating information from a plurality of networked systems by: transmitting a data request to the networked systems at a predetermined interval; receiving a first set of data at a first time point from a first subset of networked systems, the first subset of networked systems having a first set of corresponding timestamps from an immediately preceding time point, and the first set of data comprising data associated with a predetermined period of time; receiving a second set of data at the first time point from a second subset of networked systems, the second subset of networked systems having a second set of corresponding timestamps from a second time point older than the immediately preceding time point, and the second set of data comprising data associated with a period between the second time point and the first time point; receiving a third set of data at the first time point from a third subset of networked systems, the third subset of networked systems having a third set of corresponding timestamps from the immediately preceding time point, and the third set of data indicating that the third subset of networked systems are not available, wherein the first set of data and the second set of data comprise one or more central variables that are included in data from more than one networked systems of the plurality of networked systems and one or more associated variables that describe one or more aspects of the central variables; retrieving one or more data transformation rules based on a relational map among the central variables and the associated variables; aggregating the first and second sets of data into one or more master data structures corresponding to the central variables based on the data transformation rules, each of the one or more master data structures comprising one or more data fields that correspond to one of the central variables and a subset of the associated variables; and updating the first and second sets of corresponding timestamps based on the first time point; and generating one or more data reports based on the master data structures.

Other systems, methods, and computer-readable media are also discussed herein.

BRIEF DESCRIPTION OF THE DRAWINGS

FIGS. 6A and 6B depict exemplary timelines of timestamps for different networked systems before and after data aggregation, consistent with the disclosed embodiments.

DETAILED DESCRIPTION

Figure 1A:
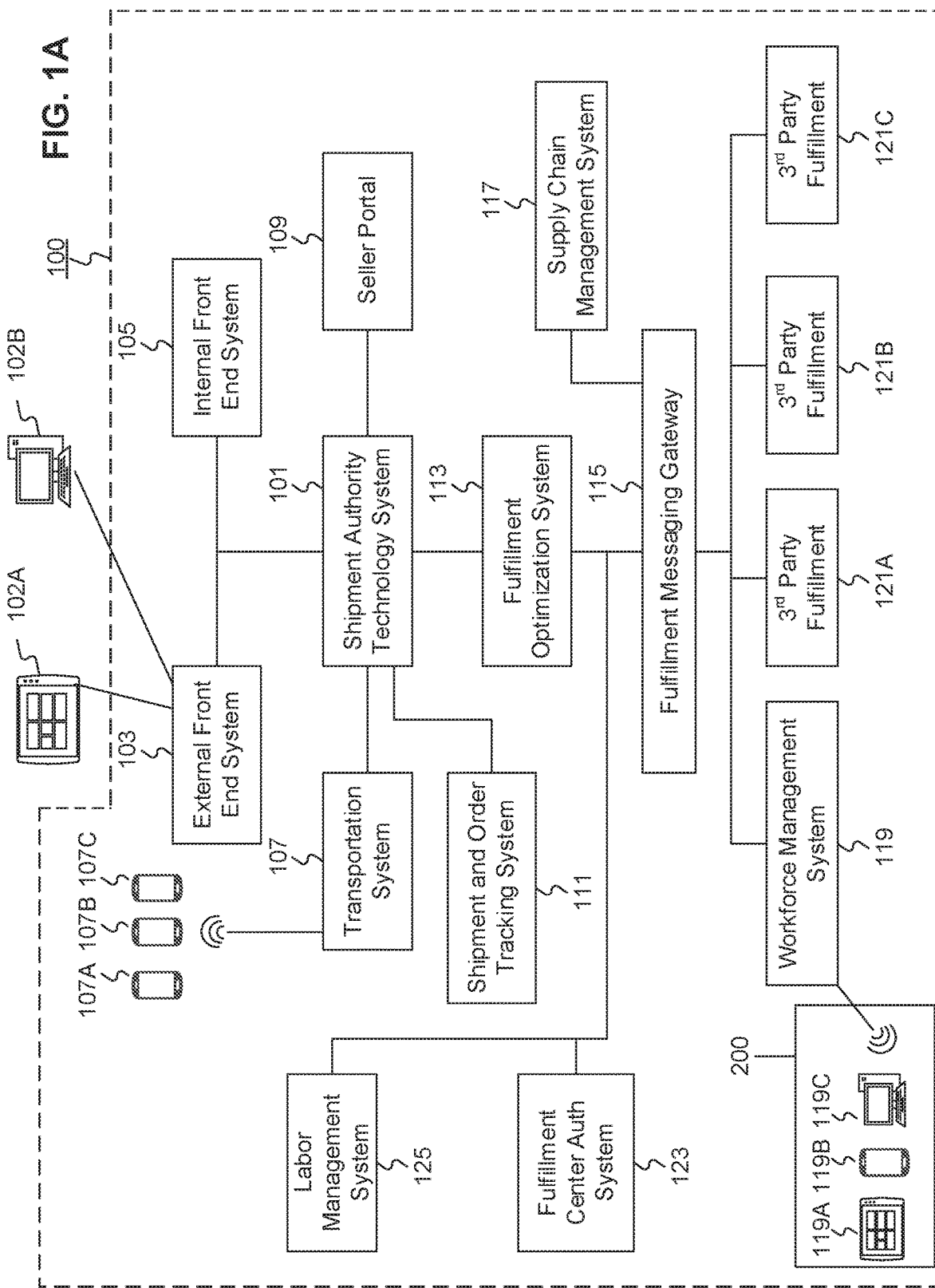
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods for dynamic aggregation of data and minimization of data loss.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, workforce management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where network 101 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from workforce management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfillment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors.

For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Workforce management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMA 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
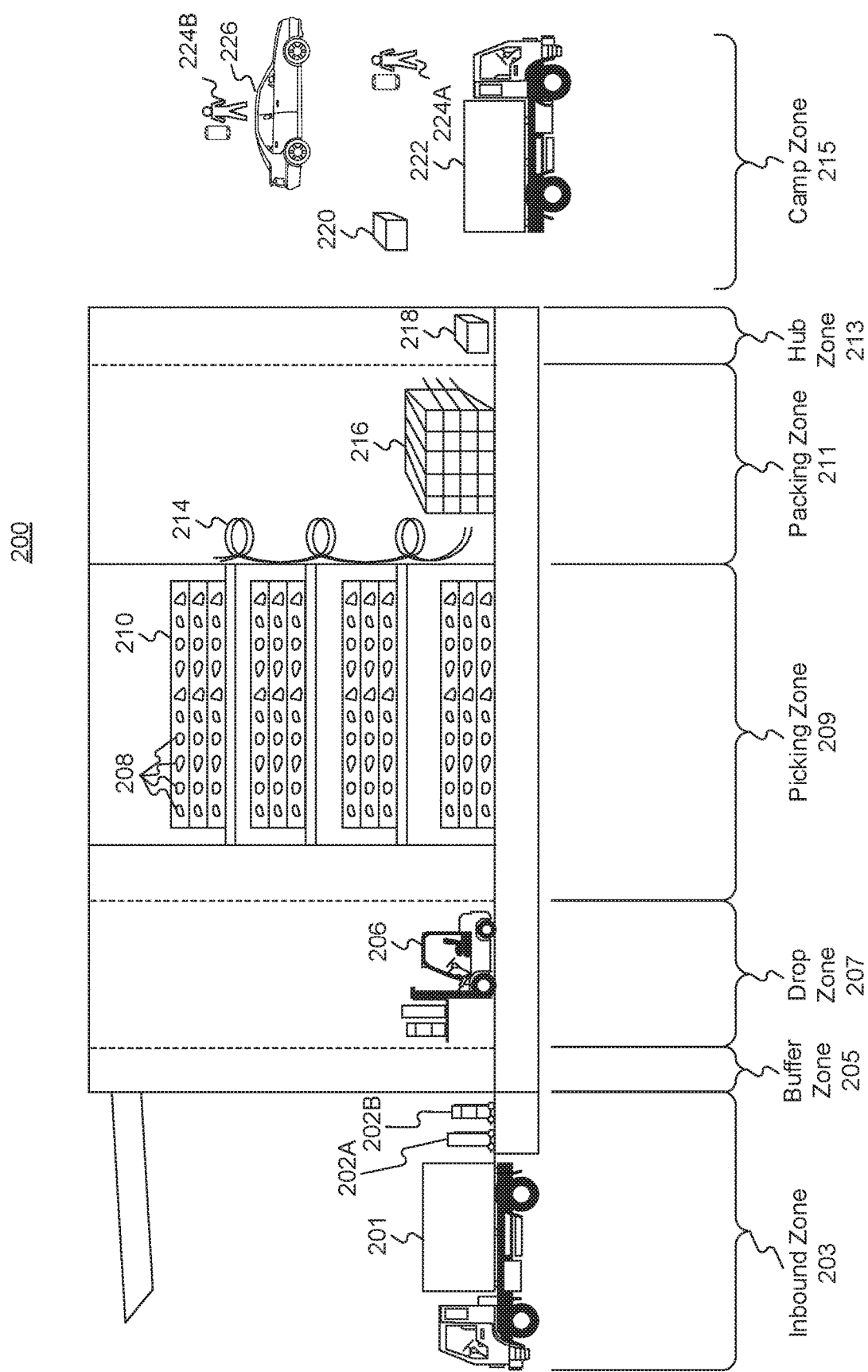
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 1198.

Once a user places an order, a picker may receive an instruction on device 1198 to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
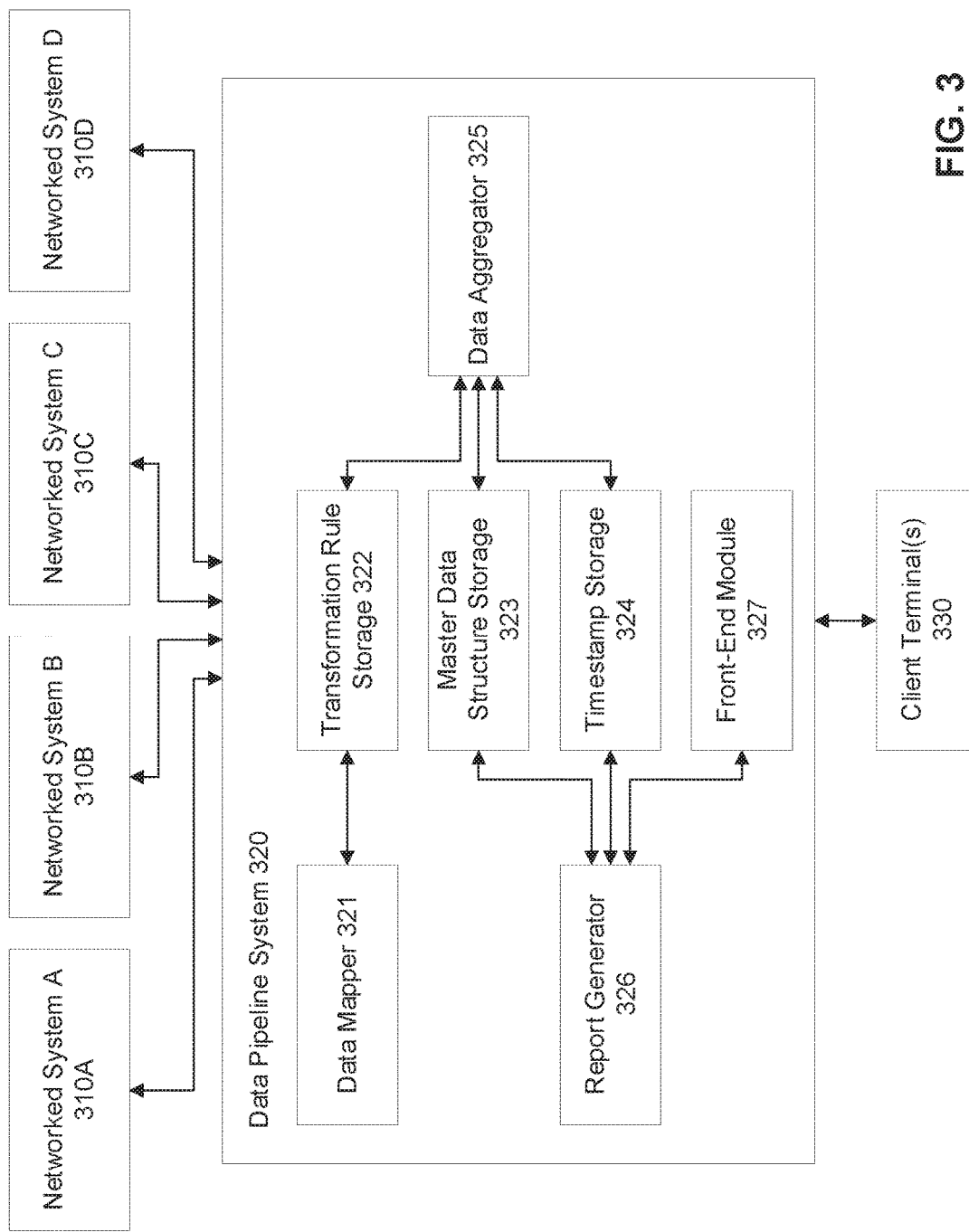
FIG. 3 depicts a schematic block diagram illustrating an exemplary embodiment of a networked environment comprising computerized systems for aggregating data and minimizing data loss, consistent with the disclosed embodiments.

FIG. 3 depicts a schematic block diagram illustrating an exemplary embodiment of a networked environment 300 comprising computerized systems for aggregating data and minimizing data loss. Environment 300 may include a variety of systems, each of which may be connected to one another via one or more networks. The systems may also be connected to one another via a direct connection, for example, using a cable. The depicted systems include networked systems A-D 310A-D, a data pipeline system (DPS) 320, and one or more client terminals 320.

Networked systems 310A-D, in some embodiments, may be implemented as one or more computer systems that collect, accrue, and/or generate various data as part of their respective operations. For example, networked systems 310A-D may be similar in design, function, or operation to FO system 113, WMS 119, FC Auth 123, and LMS 125 of FIG. 1A, respectively. Alternatively, one or more of the networked systems 310A-D may be implemented as one or more databases or memories configured to store data collected, accrued, and/or generated by the respective computer systems. In some embodiments, such databases or memories may include cloud-based databases or on-premises databases. Also in some embodiments, such databases or memories may comprise one or more hard disk drives, one or more solid state drives, or one or more non-transitory memories. While only four networked systems 310A-D are depicted in FIG. 3, the number is only exemplary and networked systems may include any number of systems.

DPS 320, in some embodiments, may be implemented as a computer system configured to dynamically aggregate data from networked systems 310A-D that allows a user to analyze the data in multiple perspectives (e.g., performance over time, performance by zone, etc.). DPS 320 may also be configured to minimize data loss in the event of an unexpected system failure or a network failure by remembering exactly when it last aggregated data from a networked system in the event of a failure and resuming the aggregation from the particular networked system once the failure is resolved.

In some embodiments, DPS 320 comprises a data mapper 321, a transformation rule storage 322, a master data structure (MDS) storage 323, a timestamp storage 324, a data aggregator 325, and a report generator 326. In addition, DPS 320 may also comprise a front-end module 327 that receives data analysis queries from client terminals 330 and transmits outputs from report generator 326 to client terminals 330.

In some embodiments, DPS 320 may comprise one or more processors, one or more memories, and one or more input/output (I/O) devices. DPS 320 may take the form of a server, general-purpose computer, a mainframe computer, a special-purpose computing device such as a graphical processing unit (GPU), laptop, or any combination of these computing devices. In these embodiments, components of DPS 320 (i.e., data mapper 321, transformation rule storage 322, MDS storage 323, timestamp storage 324, data aggregator 325, report generator 326, and front-end module 327) may be implemented as one or more functional units performed by one or more processors based on instructions stored in the one or more memories. DPS 320 may be a standalone system, or it may be part of a subsystem, which may be part of a larger system.

Alternatively, components of DPS 320 may be implemented as one or more computer systems communicating with each other via a network. In this embodiment, each of the one or more computer systems may comprise one or more processors, one or more memories (i.e., non-transitory computer-readable media), and one or more input/output (I/O) devices. In some embodiments, each of the one or more computer systems may take the form of a server, general-purpose computer, a mainframe computer, a special-purpose computing device such as a GPU, laptop, or any combination of these computing devices.

Data mapper 321, in some embodiments, may include one or more computing devices configured to determine a relational map between one or more variables included in the data retrieved from networked systems 310A-D. The relational map may define how different variables included in the data from each networked systems 310A-D are related to each other. In some embodiments, data mapper 321 may define the relational map based on how one or more central variables that are associated with data from more than one of the networked systems are related to one or more associated variables that describe certain aspects of the central variables.

For example, when networked systems 310A-D includes WMS 119 and LMS 125 of FIG. 1A, data from the two systems may both contain worker identifier, where data from WMS 119 may describe a series of event data associated with the worker identifier (e.g., worker X scanned product identifier A for order identifier P at time T). Similarly data from LMS 125 may describe attendance and overtime information associated with the worker identifier (e.g., worker X worked from time T1 to time T2 on date D). Data mapper 321 may identify that the worker identifier is a central variable that can consolidate data from WMS 119 and LMS 125 and consolidate the data to describe the worker based on other associated variables (e.g., time T1, T2, T, order identifier P, etc.). Additionally or alternatively, data mapper 321 may identify order identifier as a central variable and consolidate data using other variables to describe the corresponding order (e.g., order identifier P containing product identifier A was scanned by worker identifier X at time T).

As described above, data mapper 321 may consolidate knowledge of the variables as they pertain to a real-world operation and determine a relational map among all variables included in the data from the networked systems 310A-D. In some embodiments, data mapper 321 may consider data profiles specified by each of the networked systems 310A-D, which may comprise information such as metadata, definitions of the variables, a data element synonym registry, and the like. The data element synonym registry may be a list of synonyms that may be used to describe a particular variable, which can be used to identify related or identical variables when different networked systems use different terms to describe similar variables.

In some embodiments, data mapper 321 may use the relational map to generate a set of transformation rules that dictate how data from network systems 310A-D should be organized. In other words, transformation rules may dictate how each variable included in the data from network systems 310A-D should map to different data fields of one or more MDSes described below. In some embodiments, data mapper 321 may transmit and store the transformation rules in transformation rule storage 322.

Data aggregator 325, in some embodiments, may include one or more computing devices configured to retrieve data from one or more networked systems 310A-D. Data aggregator 325 may than aggregate the retrieved data into one or more MDSes based on transformation rules retrieved from transformation rule storage 322. Specifically, data aggregator 325 may receive a data from a particular networked system (e.g., 310A), identify variables therein, retrieve corresponding transformation rules from transformation rule storage 322, and assign values corresponding to each variable to one or more data fields in one or more MDSes based on the transformation rules. In some embodiments, data aggregator 325 may also update timestamps stored in timestamp storage 324 that correspond to each networked system.

Transformation rule storage 322, MDS storage 323, and timestamp storage 324, in some embodiments, may include one or more databases or memories configured to store corresponding types of data. The three storage units (i.e., transformation rule storage 322, MDS storage 323, and timestamp storage 324), may also be implemented together as a single collection of storage devices, each occupying a portion of the single collection of storage devices. The three storage units may each include, or may collectively include, cloud-based databases or on-premises databases. In some embodiments, the three storage units may each include, or may collectively include, one or more hard disk drives, one or more solid state drives, or one or more non-transitory memories.

Report generator 326, in some embodiments, may include one or more computing devices configured to generate reports based on data analysis queries received from client terminals 330 via front-end module 327. The reports can range from simple ones that output last known aggregation time points for the networked systems 310A-D based on the timestamps stored in timestamp storage 324 to complex ones that require calculation of performance history over time by a particular worker or by a particular facility. In some embodiments, aggregation of data into MDSes may enable report generator 326 to analyze the data in multiple dimensions such as over time, by workers, by zones, by order, and the like. Furthermore, report generator 326 may enable high-level analyses of performance metrics such as number of orders processed per hour, number of idle workers, and number of orders completed on time; and detailed analyses such as average number of units processed per hour for top 10% of workers.

Front-end module 327, in some embodiments, may be implemented as a computer system that enables external users to interact with one or more components of DPS 320. For example, in embodiments where DPS 320 enables users to submit a data analysis query, front-end module 327 may be implemented as a web server that receives such queries and presents outcome of the analysis as discussed above. In some embodiments, front-end module 327 may be implemented as a computer or computers running software such as the Apache HTTP Server, Microsoft Internet Information Services (IIS), NGINX, or the like. In other embodiments, front-end module 327 may run a custom web server software designed to receive and process queries from client terminals 330, instruct other systems to acquire information from databases, run analysis, and provide responses to the received queries based on the acquired information.

Client terminals 330, in some embodiments, may include one or more computing devices configured to enable users (e.g., business owners or facility operators) to access DPS 320 via front-end module 327. Client terminals 330 may include any combination of computing devices such as personal computers, mobile phones, smartphones, PDAs, or the like. In some embodiments, users may use client terminals 330 to access a web interface provided by front-end module 327 and submit a query for data analysis. And once the data analysis is complete, users may use client terminals 330 to receive outcomes via the web interface provided by front-end module 327.

Figure 4:
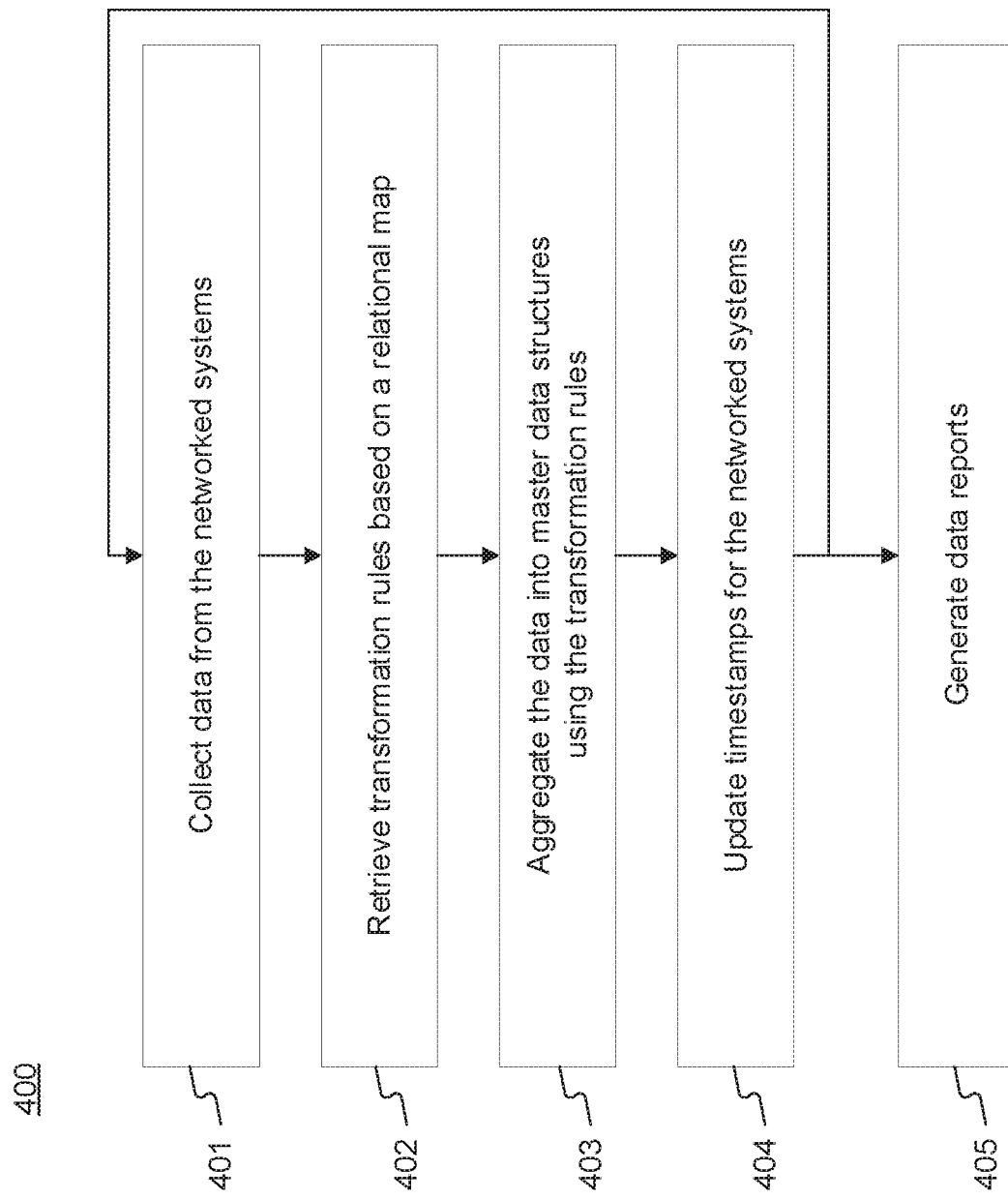
FIG. 4 depicts a flowchart of an exemplary computerized process for aggregating data from a plurality of networked systems, consistent with the disclosed embodiments.

FIG. 4 depicts a flowchart of an exemplary computerized process 400 for aggregating data from a plurality of networked systems. In some embodiments, process 400 may be performed by data aggregator 325 using information from other components of DPS 320 as described above.

Figure 5:
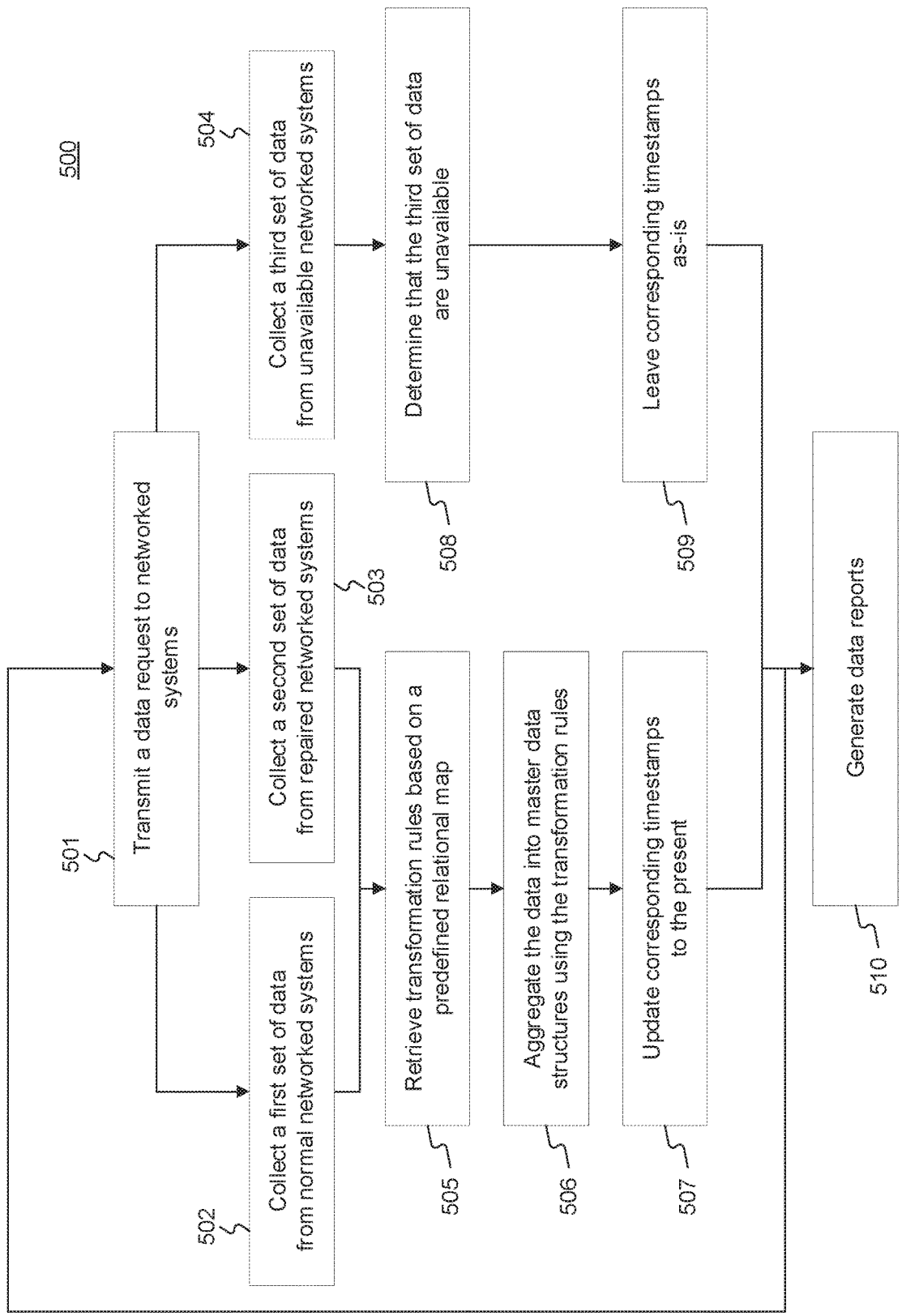
FIG. 5 depicts a flowchart of an extended exemplary computerized process for aggregating data from a plurality of networked systems with additional steps for minimizing data loss, consistent with the disclosed embodiments.

FIG. 5 depicts a flowchart of an extended exemplary computerized process 500 for aggregating data from a plurality of networked systems with additional steps for minimizing data loss. In some embodiments, extended process 500 may also be performed by data aggregator 325, similar to process 400, using information from other components of DPS 320 as described above.

FIGS. 6A and 6B depict exemplary timelines 610 and 620 of timestamps for different networked systems before and after data aggregation. Following descriptions of process 400 and extended process 500 will make reference to FIGS. 6A and 6B for clarity.

Referring back to FIG. 4, data aggregator 325 may repeat steps 401-404 at predetermined intervals (i.e., checkpoint interval 604 of FIG. 6A). At step 401, data aggregator 325 may begin one cycle of steps 401-404 by collecting a set of data from networked systems 310A-D. This collection of data may occur, for example, at a current time point 602. Tick marks 601 on timelines 610 and 620 mark different time points (i.e., checkpoints) over time. In some embodiments, data aggregator 325 may retrieve data from each network system (e.g., 310A) that accumulated over a predetermined period of time called regular collection window 605, which may be equal to checkpoint interval 604 or longer by a predetermined overlap 607. In some embodiments, regular collection window 605 may be equal to or longer than twice checkpoint interval 604.

In some embodiments, checkpoint interval 604 may be user selectable and/or may range anywhere from mere seconds or a fraction of a second to hours or days. A smaller checkpoint interval 604 may allow a more rapid repetition of steps 401-404, which would result in a more frequent data aggregation, allowing report generator 326 to provide more up-to-date data analysis reports. In some embodiments, checkpoint interval 604 may be sufficiently small to provide near real-time or real-time reports.

At step 402, data aggregator 325 may retrieve data transformation rules from transformation rule storage 322 based on a relational map among central variables and associated variables included in the data from the networked systems 310A-D. This may involve, in some embodiments, generating, by data aggregator 325, a list of variables included in the data and querying transformation rule storage 322 to retrieve transformation rules associated with any of the variables.

At step 403, data aggregator 325 may aggregate the data into one or more master data structures (MDSes) corresponding to the central variables based on the retrieved transformation rules. In some embodiments, each of the MDSes may comprise data fields that correspond to one of the central variables and a subset of the associated variables. For example, an MDS may comprise data fields corresponding to an order identifier, a received date, a PDD, a status identifier, and the like. In other embodiments, each of the MDSes may contain a central data field that corresponds to one of the central variables and contain additional data fields that correspond to any of the central or associated variables. For example, an MDS may comprise a central data field for an order identifier and a plurality of data fields for a received date, a PDD, a status identifier, a worker identifier, and the like.

In this way, data aggregator 325 may, for each data retrieved from networked systems 310A-D, assign values of variables stored therein to one or more corresponding data fields in one or more MDSes. For example, data aggregator 325 may assign a value for an order identifier included in data from FO system 113 to a central data field in one MDS and a data field in another MDS that use worker identifier as the central variable.

In some embodiments, aggregating the data into MDSes may comprise sorting the data from networked systems 310A-D based on time from oldest to latest and iterating through the sorted data chronologically to replace existing values in data fields of the MDSes with the values from the data. In some instances where a data field is empty, data aggregator 325 may simply assign the value from the data as a new value for the data field.

At step 404, data aggregator 325 updates timestamps (e.g., timestamp A 612 and timestamp C 614 for networked systems A and C 310A and 310C) for networked systems 310A-D. Timestamp storage 324 may store and keep track of timestamps for each networked system 310A-D. Under normal operation where there has been no unexpected failure, all timestamps may be set to a time point immediately preceding current time point 602 during a previous data aggregation, like timestamps A 612 and C 614 in FIG. 6A. After a successful data aggregation, data aggregator 325 may update corresponding timestamps to the current time point 602, like an updated timestamp A 622 and an updated timestamp C 624 in FIG. 6B.

Once data aggregation is complete, data aggregator 325 may wait until the next time point 603, a checkpoint interval in the future from current time point 602, and repeat steps 401-404. Additionally or alternatively, report generator 326 may, at step 405, generate data reports in response to data analysis queries submitted by a user via client terminal(s) 330 as described above.

Referring to FIG. 5, extended process 500 depicts more detail to process 400 that allows DPS 320 to keep track of data aggregation with respect to each networked system and minimize data loss. Given a number of networked systems 310A-D, the systems are always at risk of unexpected failures such as a network outage or a system-level failure. As such, networked systems 310A-D may be divided into three categories at any given moment: (1) those that completed data aggregation at the immediately preceding checkpoint (normal networked systems), (2) those that had been unavailable for any number of reasons but are currently available for aggregation (i.e., repaired networked systems), and (3) those that are currently unavailable (unavailable networked systems).

At the beginning of a data aggregation cycle (e.g., steps 401-404 of FIG. 4), data aggregator 325 may, at step 501, transmit a data request to networked systems 310A-D. In response, data aggregator 325 may receive and collect three sets of data from the three categories of networked systems 310A-D. Specifically, data aggregator 325 may receive, at step 502, a first set of data from normal networked systems (e.g., 310A and 310C); at step 503, a second set of data from repaired networked systems (e.g., 310B); and at step 504, a third set of data from unavailable networked systems (e.g., 310D). In some embodiments, unavailable networked systems (e.g., 310D) may return nothing or a timeout exception. And in some embodiments, data aggregator 325 may identify different categories of networked systems 310A-D based on the received sets of data as described above and/or based on respective timestamps stored in timestamp storage 324. For example, the timestamps corresponding to normal networked systems (e.g., 310A and 310C) may be set at checkpoint A 612 and checkpoint C 614, respectively, immediately preceding current time point 602, and the timestamps corresponding to unavailable or repaired networked systems (e.g., 310D and 310B) may be set at any of the previous checkpoints such as checkpoint D 615 and checkpoint B 613, respectively, because data aggregator 325 may have been unable to update them in a previous cycle, or it may have omitted them to keep track of each networked system. To be clear, data aggregator 325 may differentiate between unavailable and repaired networked systems based on the collected data at step 508.

For normal and repaired networked systems (e.g., 310A, 310C, and 310B), data aggregator 325 aggregates data in a manner described above with respect to FIG. 4. However, one of differences between the two categories of networked systems is that data from normal networked systems comprise those that accrued during regular collection window 605 as described above, while data from repaired networked systems comprise those that accrued during an extended collection window 606. Extended collection window may span, at minimum, the period of time from a corresponding timestamp of the repaired networked system (e.g., timestamp 613) to the current time point 602. In some embodiments, extended collection window may also comprise an amount of time equal to predetermined overlap 607.

After aggregating data from both categories of networked systems, data aggregator may, at step 507, update corresponding timestamps to current time point 602. For example, data aggregator 325 may update timestamp A 612 and timestamp C 614 corresponding to normal networked systems 310A and 310C to updated timestamp A 622 and updated timestamp C 624, respectively; and update timestamp B 613 corresponding to repaired networked system 310B to updated timestamp B 623.

On the other hand, timestamp (e.g., timestamp D 615) corresponding to unavailable networked systems (e.g., 310D) may be stuck at some time point in the past. And data aggregator 325 may also leave the corresponding timestamps as-is in the past at step 509, so that data aggregator 325 may resume from the last successful data aggregation for the particular networked system when the networked system is repaired. At some point in the future when networked system 310D is repaired and becomes available again, data aggregator 325 may aggregate the data from a time point preceding timepoint D 615 by predetermined overlap 607 to the then current time point.

Once data aggregation is complete for all three categories of networked systems 310A-D, data aggregator 325 may wait until the next time point 603 and repeat steps 501-509. Additionally or alternatively, report generator 326 may, at step 510, generate data reports in response to the data analysis queries in a manner similar to step 510 of FIG. 4.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for dynamic aggregation of data and minimization of data loss, the system comprising:
    a memory storing instructions; and
    at least one processor configured to execute the instructions for:
        aggregating information from a plurality of networked systems by:
            collecting a first set of data at a first time point from the networked systems, the first set of data comprising data associated with a predetermined period of time and comprising one or more central variables that are included in data associated with more than one networked systems of the plurality of networked systems and one or more associated variables that describe one or more aspects of the central variables, each of the central variables and the associated variables comprising a corresponding value;
            retrieving one or more data transformation rules based on a relational map among the central variables and the associated variables;
            aggregating the first set of data into one or more master data structures corresponding to the central variables based on the data transformation rules, each of the one or more master data structures comprising one or more data fields that correspond to one of the central variables and a subset of the associated variables;
            determining that a second subset of the networked systems is available after a gap of time; and
            updating one or more timestamps corresponding to the networked systems based on the first time point; and
        generating one or more data reports based on the master data structures,
        wherein collecting the first set of data from the networked systems further comprises collecting a second set of data from the second subset of the networked systems, the second set of data comprising data associated with the gap of time, and
        wherein aggregating the first set of data into the master data structures further comprises aggregating the second set of data into the master data structures.

2. The computer-implemented system of claim 1, wherein the data transformation rules define how a value in the first set of data corresponds to one or more data fields of the master data structures.

3. The computer-implemented system of claim 1, wherein a subset of the data transformation rules assigns values of one or more of the associated variables to more than one data field of the master data structures.

4. The computer-implemented system of claim 1, wherein the processor is configured to repeat the instructions for aggregating information from the networked systems at a predetermined interval, wherein the predetermined interval is less than or equal to the predetermined period.

5. The computer-implemented system of claim 4, wherein the predetermined interval is equal to or less than one minute.

6. The computer-implemented system of claim 1, wherein aggregating the information from the networked systems further comprises:
    determining that a first subset of the networked systems is unavailable; and
    updating one or more timestamps corresponding to the networked systems,
    wherein aggregating the first set of data into the master data structures omits a subset of the data transformation rules that correspond to a subset of data corresponding to the first subset of the networked systems, and
    wherein updating the timestamps omits updating timestamps that correspond to the first subset of the networked systems.

7. The computer-implemented system of claim 1, wherein aggregating the first set of data comprises:
    sorting the first set of data in sequence based on time;
    iterating through the sorted first set of data chronologically to replace existing values of one or more data fields in the master data structures with the values from the sorted first set of data.

8. The computer-implemented system of claim 1, wherein the relational map is determined based on one or more data profiles of the networked systems, the data profiles comprising at least one of one or more metadata, one or more definitions of the associated variables, and a data element synonym registry.

9. The computer-implemented system of claim 1, wherein generating the data reports comprises analyzing the master data structures to determine one or more performance metrics associated with the networked systems.

10. A computer-implemented method for dynamic aggregation of data and minimization of data loss, the method comprising:
    aggregating information from a plurality of networked systems by:
        collecting a first set of data at a first time point from the networked systems, the first set of data comprising data associated with a predetermined period of time and comprising one or more central variables that are included in data associated with more than one networked systems of the plurality of networked systems and one or more associated variables that describe one or more aspects of the central variables, each of the central variables and the associated variables comprising a corresponding value;
        retrieving one or more data transformation rules based on a relational map among the central variables and the associated variables;
        aggregating the first set of data into one or more master data structures corresponding to the central variables based on the data transformation rules, each of the one or more master data structures comprising one or more data fields that correspond to one of the central variables and a subset of the associated variables;
        determining that a second subset of the networked systems is available after a gap of time; and
        updating one or more timestamps corresponding to the networked systems based on the first time point; and
    generating one or more data reports based on the master data structures,
    wherein collecting the first set of data from the networked systems further comprises collecting a second set of data from the second subset of the networked systems, the second set of data comprising data associated with the gap of time, and
    wherein aggregating the first set of data into the master data structures further comprises aggregating the second set of data into the master data structures.

11. The computer-implemented method of claim 10, wherein the data transformation rules define how a value in the first set of data corresponds to one or more data fields of the master data structures.

12. The computer-implemented method of claim 10, wherein a subset of the data transformation rules assigns values of one or more of the associated variables to more than one data fields of the master data structures.

13. The computer-implemented method of claim 10, wherein the processor is configured to repeat the instructions for aggregating information from the networked systems at a predetermined interval, wherein the predetermined interval is less than or equal to the predetermined period.

14. The computer-implemented method of claim 10, wherein aggregating the information from the networked systems further comprises:
    determining that a first subset of the networked systems is unavailable; and
    updating one or more timestamps corresponding to the networked systems,
    wherein aggregating the first set of data into the master data structures omits a subset of the data transformation rules that correspond to a subset of data corresponding to the first subset of the networked systems, and
    wherein updating the timestamps omits updating timestamps that correspond to the first subset of the networked systems.

15. The computer-implemented method of claim 10, wherein aggregating the first set of data comprises:
    sorting the first set of data in sequence based on time;
    iterating through the sorted first set of data chronologically to replace existing values of one or more data fields in the master data structures with the values from the sorted first set of data.

16. The computer-implemented method of claim 10, wherein the relational map is determined based on one or more data profiles of the networked systems, the data profiles comprising at least one of one or more metadata, one or more definitions of the associated variables, and a data element synonym registry.

17. The computer-implemented method of claim 10, wherein generating the data reports comprises analyzing the master data structures to determine one or more performance metrics of the networked systems.

18. A computer-implemented system for dynamic aggregation of data and minimization of data loss, the system comprising:
    a memory storing instructions; and
    at least one processor configured to execute the instructions for:
        aggregating information from a plurality of networked systems by:
            transmitting a data request to the networked systems at a predetermined interval;
            receiving a first set of data at a first time point from a first subset of networked systems, the first subset of networked systems having a first set of corresponding timestamps from an immediately preceding time point, and the first set of data comprising data associated with a period of time between the immediately preceding time point and the first time point;
            receiving a second set of data at the first time point from a second subset of networked systems, the second subset of networked systems having a second set of corresponding timestamps from a second time point older than the immediately preceding time point, and the second set of data comprising data associated with a period between the second time point and the first time point;
            receiving a third set of data at the first time point from a third subset of networked systems, the third subset of networked systems having a third set of corresponding timestamps from the immediately preceding time point, and the third set of data indicating that the third subset of networked systems are not available,
            wherein the first set of data and the second set of data comprise one or more central variables that are included in data from more than one networked systems of the plurality of networked systems and one or more associated variables that describe one or more aspects of the central variables;
            retrieving one or more data transformation rules based on a relational map among the central variables and the associated variables;
            aggregating the first and second sets of data into one or more master data structures corresponding to the central variables based on the data transformation rules, each of the one or more master data structures comprising one or more data fields that correspond to one of the central variables and a subset of the associated variables; and
updating the first and second sets of corresponding timestamps based on the first time point; and
generating one or more data reports based on the master data structures.

\* \* \* \* \*